Dec. 13, 1932.　　E. H. ALDEBORGH ET AL　　1,891,196
COMBINATION DIAL INDICATOR
Filed May 11, 1932　　2 Sheets-Sheet 1

INVENTOR.
Erik H. Aldeborgh
Christian E. Ruf.
BY John Thompson
ATTORNEY.

Dec. 13, 1932. E. H. ALDEBORGH ET AL 1,891,196
COMBINATION DIAL INDICATOR
Filed May 11, 1932    2 Sheets-Sheet 2

INVENTOR.
Erik H. Aldeborgh.
Christian E. Ruf.
BY John J. Thompson
ATTORNEY.

Patented Dec. 13, 1932

1,891,196

UNITED STATES PATENT OFFICE

ERIK H. ALDEBORGH AND CHRISTIAN E. RUF, OF POUGHKEEPSIE, NEW YORK, ASSIGNORS TO STANDARD GAGE COMPANY, INC., OF POUGHKEEPSIE, NEW YORK, A CORPORATION OF NEW YORK

COMBINATION DIAL INDICATOR

Application filed May 11, 1932. Serial No. 610,552.

Our invention relates to a combination dial indicator gage of that class which is intended to be mounted in a tool post, fixture or other support and brought into contact with the work to measure external dimensions either in checking or production work with extreme accuracy and speed.

The invention relates particularly to what is known as a 90 degree indicator, in which the actuating plunger which is contacted with the work is placed at right angles to the dial, in place of the usual manner of having the actuating or contact plunger in parallel relation to the dial.

While there are instruments of this class now in use they depend for their action upon the use of pins engaging spiral grooves formed in a spindle whereby the direction of movement of the operating mechanism of the instrument is changed, but this has been found to be unsatisfactory in many ways and necessitates many parts and a particular design of instrument, and one not adapted for any other uses.

The object of this invention is to provide an instrument of this class that shall be in the form of a combination of a standard dial indicator, which by the interchanging of the regular back plate with a special back plate having a contact plunger mounted therein and at an angle thereto will be capable of converting a standard dial indicator into a 90 degree dial indicator without the use of special construction.

Another object of the invention is to provide in an instrument of this class, means whereby the dial indicator may be operated in the usual manner, and as a 90 degree indicator at the same time and without any change of parts, thus producing a universal dial indicator of the plunger type.

A further object of the invention is to provide an instrument of this class that shall be compact, contain few parts, and be free from back-lash and lost motion, yet simple of construction and cheap to make, owing to the use of standard parts and its adaptability for use either as a regular plunger type dial indicator, or as a 90 degree dial indicator, thus combining two instruments in one.

In carrying out the novel construction of this combination instrument, we have employed the construction of dial indicator gage which is shown and described in our application for United States patent, filed on June 30, 1928, under Serial No. 289,488, the only change having been made therein, being the substitution of a special back plate and its attachments, and the addition of an angle block to the contact operating plunger which is mounted within the casing, all of which will hereinafter be fully described and claimed.

With these and other objects in view, our invention consists in certain novel construction and combination of parts as will hereinafter be fully described and claimed, and illustrated in the accompanying drawings which form a part hereof and in which like figures of reference refer to corresponding parts in all of the views, and it is understood that slight changes may be made without departing from the spirit of the invention.

In the drawings—

Referring to the drawings—

Figure 1:
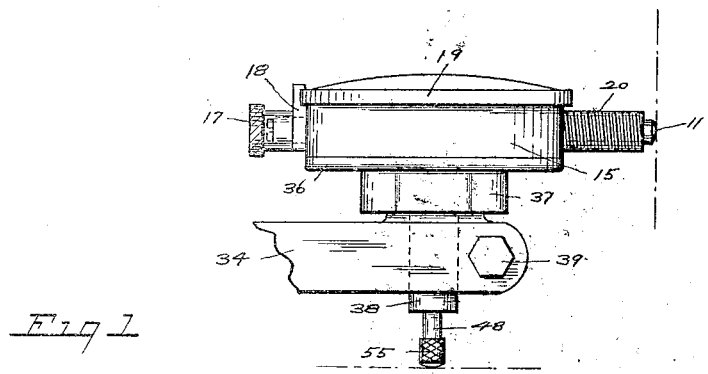
Figure 1 shows the instrument mounted and in position for use either as a regular plunger type dial indicator or as a 90 degree dial indicator.

The instrument comprises the type of dial indicator which is described in detail in our above referred to application for patent, or to a similar style of dial indicator in which the indicating pointer is rotated in relation to a graduated dial by a train of gearing mounted within a casing 13, and operated by a combined contact plunger and rack, having the rack teeth 10 formed on the plunger 11, which is slidably mounted within the bearings 12 and 14 which are secured in axial relation with each other to a body member 15.

The bearing 12 is provided with the external threads 16 for a cap 17 threaded thereon for the purpose of closing the end of said bearing and for locking in place a clamp 18 which holds the bezel 19 in place and also in an adjusted position.

The bearing 14 is also formed with the external threads 20 for a threaded cap 21 to protect the end of the contact plunger 11 when not in use.

The contact or rack plunger 11 is guided in its movement and prevented from rotating by a pin 22 secured thereto at right angles and sliding within a guide 23 which is attached to the gear casing 13, and is retained in a normal outward or extended position with the pointer at zero by the spring 25 which has one end attached to said pin 22 and the other end attached to the body member 15 by the pin 26.

The pinion shaft 27 has a pinion 28 mounted thereon in mesh with the rack 10, but the other gears of the train are not herewith shown as they have no direct bearing on the subject matter of this patent and are fully described in our copending application; said gear casing 13 being mounted to the gear plate by the screws 29 and said casing 13 being threaded as at 30 for the back plate attaching screws 31.

Figures 2, 3:
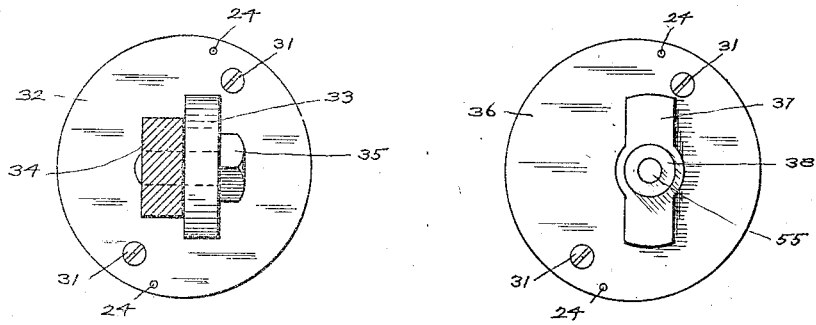
Figure 2 shows a rear view of a standard dial indicator with the usual style of back plate attached thereto.
Figure 3 is a similar view, but with the special 90 degrees back plate substituted for the regular back plate.
Figures 4, 5, 6:
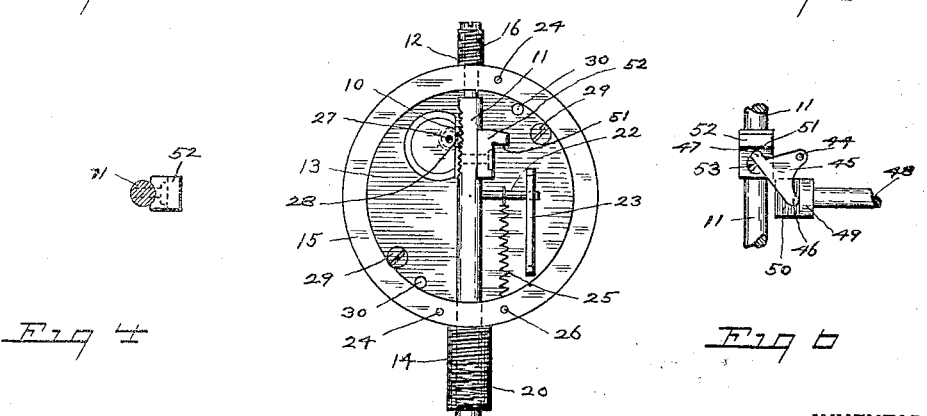
Figure 4 is a detail cross sectional view of the regular contact plunger rack, showing the actuating angle member attached thereto.
Figure 5 is a rear elevation of the instrument with the back plate removed, to show the arrangement of the several parts.
Figure 6 is a detail view showing the means for translating the vertical movement of the 90 degree plunger to the horizontal movement of the regular rack plunger.

As shown in Figure 2, the standard back plate 32 is formed with a lug 33 by which the instrument may be attached to a tool post or fixture 34 by a screw 35, but in the construction here shown in Figures 1, 3, 7, 8 and 9, this back plate 32 is removed and a special back plate 36 is substituted in its place.

This special back plate 36 is formed with a rectangular boss 37 extending at right angles from the back face thereof and slightly off center, and this boss 37 is provided with a tubular portion or stem 38 which is machined on the outside for mounting in a fixture or tool post 34 by a clamp screw 39.

Figure 7:
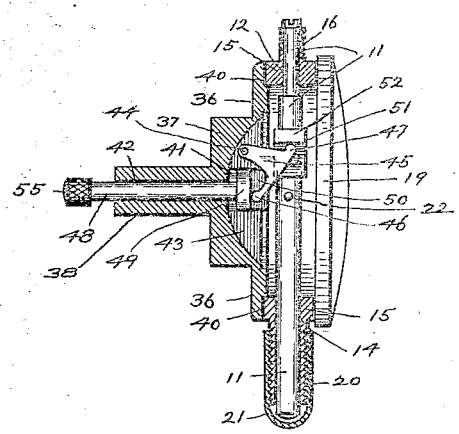
Figure 7 shows a vertical sectional view illustrating the arrangement and operation of the several parts.
Figure 8:
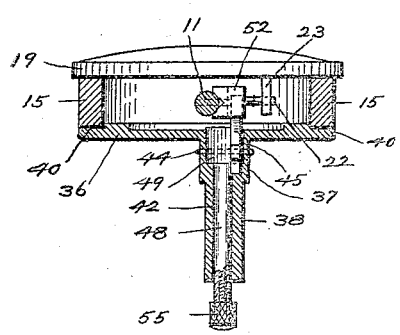
Figure 8 shows a horizontal sectional view of the same.
Figure 9:
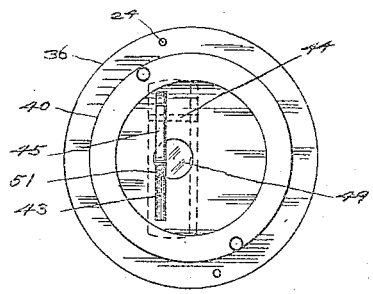
Figure 9 shows a view of the innerside of the special back plate.

Referring to Figures 7, 8 and 9, it will be seen that this special back plate 36 is flanged as at 40 to centralize it with the body member 15, and that the tubular portion or stem 38 is formed with a bore of two different diameters 41 and 42, the larger bore 41 communicating with a slot 43 which is formed in the boss 37 and within said slot 43 is pivoted on the cross pin 44 a bell crank lever 45 which is formed with the rounded ends 46 and 47, both of which are ground.

Within the bores 41 and 42 is slidably mounted a plunger 48 formed with a head 49 having one side cut-away as at 50 to form a seat against which rests the rounded end 46 of the bell crank lever 45, in such a manner that when the contact 90 degree plunger 48 is forced inward as it contacts with the work, the bell crank lever 45 will be rocked on its pivot pin 44, and as the rounded end 47 is in contact with the seat 51 of the angle member 52, which is secured to the rack plunger 11 by the screw 53, the movement of the 90 degree plunger will transmit movement through the bell crank lever 45 to the rack plunger 11 to operate the pointer hand; the end of the 90 degree plunger 48 being provided with a contact point 55 attached thereto.

The operation of the device as a 90 degree indicator is as follows—

The instrument having been secured in a holder as shown in Figure 1, the work is brought into contact with the contact point 55, forcing the same upward and thereby by the flanged head 49 and the seat 51 bearing against the rounded end 46 of the bell crank lever 45, said bell crank lever 45 is rocked upon the pin 44 and the rounded end 47 will bear against and move the seat 51 and angle block 52 together with the rack plunger 11 and rotate the train of gears to rotate the pointer with respect to the dial.

Having thus described our invention, what we claim as new and desire to secure by Letters Patent, is—

1. A dial indicator of the class described, comprising in combination a casing having a contact plunger operated mechanism therein, a back plate for said casing and a plunger for operating said mechanism protruding from said casing and a second contact plunger mounted in said back plate and means for imparting movement from the second contact plunger to the first plunger.

2. A dial indicator of the class described comprising in part, of a casing having a plunger operated mechanism therein and a plunger for operating said mechanism protruding from said casing, a back plate detachably secured to said casing, a contact plunger mounted in said back plate at right angles to the first plunger, and means mounted in said back plate between said contact plunger and said first plunger for imparting movement from the second plunger to the first plunger.

3. A dial indicator of the class described comprising in part of a casing having a rack plunger mechanism therein, a back plate interchangeable with said casing, a second contact plunger mounted in said back plate, means for imparting movement from the second plunger to the rack plunger, comprising a lever pivoted within said back plate and in contact with both of said plungers.

4. A combination dial indicator of the class described, comprising in combination with a casing having a rack plunger and operating mechanism therein, of an angle member secured to said rack plunger, an interchangeable back plate for said casing, a boss formed on said back plate and provided with a bearing bore therein, said back plate formed with a slot communicating with said bore, a bell crank lever pivoted within said slot with one of its ends in contact with said angle member, a second contact plunger slidably mounted within said bore with its contact end projecting therefrom, a head formed on said plunger and having a cut-out portion forming a seat in contact with the other end of said bell crank lever.

In testimony whereof, we affix our signatures.

ERIK H. ALDEBORGH.
CHRISTIAN E. RUF